United States Patent [19] [11] 4,431,782
Harris et al. [45] Feb. 14, 1984

[54] PROCESS FOR THE PREPARATION OF RADIATION-CURABLE, WATER-THINNABLE VINYL ESTER RESINS

[75] Inventors: Robert F. Harris; Dwight K. Hoffman, both of Midland, Mich.

[73] Assignee: The Dow Chemical Company, Midland, Mich.

[21] Appl. No.: 456,225

[22] Filed: Jan. 7, 1983

Related U.S. Application Data

[63] Continuation-in-part of Ser. No. 286,739, Jul. 27, 1981, abandoned.

[51] Int. Cl.$^3$ ............................................. C08F 283/00
[52] U.S. Cl. ..................................... 525/531; 525/922
[58] Field of Search ................................. 525/531, 922

[56] References Cited

U.S. PATENT DOCUMENTS

| | | | |
|---|---|---|---|
| 3,560,237 | 2/1971 | Miller | 427/44 |
| 3,661,576 | 5/1972 | Crary | 430/288 |
| 3,673,140 | 6/1972 | Ackerman et al. | 260/22 |
| 3,894,922 | 7/1975 | Bosso et al. | 260/29.2 |
| 3,936,405 | 2/1976 | Sturni et al. | 260/29.6 |
| 3,937,679 | 2/1976 | Bosso et al. | 260/293 |
| 4,020,030 | 4/1977 | Harris et al. | 260/29.2 |
| 4,049,745 | 9/1977 | Schuster et al. | 525/531 |
| 4,338,232 | 7/1982 | Harris et al. | 523/414 |

FOREIGN PATENT DOCUMENTS 2548394 5/1977 Fed. Rep. of Germany .
1375177 11/1974 United Kingdom .

*Primary Examiner*—Melvyn I. Marquis

[57] ABSTRACT

Sulfonium-stabilized, water-compatible, radiation-curable vinyl ester resins are prepared by the process of reacting an epoxy resin having on the average at least one vicinal epoxy group with a mercaptan and with an unsaturated monocarboxylic acid to form vinyl ester resins containing sulfide moieties which are then reacted with a protonic acid and an alkylene oxide.

Compounds so prepared can be diluted with water and used as coatings.

16 Claims, No Drawings

PROCESS FOR THE PREPARATION OF RADIATION-CURABLE, WATER-THINNABLE VINYL ESTER RESINS

CROSS-REFERENCE TO RELATED APPLICATIONS

This application is a continuation-in-part of application Ser. No. 286,739, filed July 27, 1981 now abandoned.

BACKGROUND OF THE INVENTION

This invention pertains to vinyl ester compounds and their use as coatings for substrates. More particularly, this invention pertains to the process for preparing such compositions derived from epoxy compounds.

It is known that many vinyl ester resins are polymerizable by radiation inducement as is illustrated in U.S. Pat. Nos. 3,560,237 (Re. 27,656); 3,661,576; 3,673,140 and British Pat. No. 1,375,177. In addition, U.S. Pat. Nos. 3,560,237 (Re. 27,656) and 3,661,576 pertain to vinyl ester resins derived from resinous epoxide compounds (i.e., epoxy resins). Many of these vinyl ester resins which are derived from resinous epoxides are commercially available, possess excellent physical and chemical properties, and are particularly useful as protective coatings for a variety of substrates. In such a utility, the vinyl ester resins are normally dissolved in an organic solvent or a reactive diluent, applied to a substrate by any one of several conventional techniques such as spraying or dipping, and cured with actinic radiation.

It is also known that certain sulfonium salts can be used as accelerators for the photopolymerization of acid polymerizable and/or acid-curable materials including epoxy resins per se, as taught in Netherland Patent Application No. 75.10320. It is taught that the sulfonium salts must be soluble in the resinous component and that the ability of a sulfonium salt to accelerate the cure of any particular material depends upon the ability of the corresponding acid, that is, the acid containing the same anion as the sulfonium salt, to cure that material. These photocurable compositions are dissolved in an organic solvent and applied to various substrates by conventional techniques.

The necessity of using an organic solvent is a commercial impediment for using the photocurable compositions set forth above. Organic solvents must be recovered and recycled or disposed of for safety, environmental or economic reasons. The recovery in many instances is difficult and costly. These problems can be reduced if the organic solvent reacts into the coating. Considerable research has been directed toward the use of vinyl monomers and low viscosity vinyl resins as reactive diluents. However, many of the useful reactive diluents, such as 2-hydroxyethyl acrylate, are toxic and represent considerable health and environmental problems.

Presently available radiation-curable systems use a reactive diluent such as an acrylic monomer to reduce the viscosity to the level required for application. Many of these diluents suffer from excessive toxicity, volatility or odor. In addition, because the diluent is incorporated into the final product, the amount and kind of diluent will affect the properties of the end coating. With conventional solvent systems, additional solvent can be added to adjust viscosity without materially affecting the properties of the final coating. However, the presence of these solvents poses a toxicity problem.

The commercial problems enumerated above have caused many potential customers to use alternate systems having different mechanisms of cure and/or different polymer structure, such as, for example, latexes. In addition, many resinous systems have been rendered water-soluble or water-dispersible by attaching various onium groups, such as sulfonium, phosphonium, or ammonium, to the backbone of the resin or by adding an onium surfactant to the resin as a dispersing vehicle. Many of these onium compounds are electroreducible, particularly the sulfonium and isothiuronium compounds, and have been used in cathodic electrodeposition processes. An exhaustive documentation of this is not required; however, reference is made to U.S. Pat. Nos. 3,793,278; 3,936,405; 3,937,679; 3,959,106 and 3,894,922 which represent a series of cases in which certain onium-modified epoxy resins are alleged to be useful as electrodepositable compositions. The onium-modified epoxy resins are typically prepared by reacting an epoxy resin with a tertiary phosphine, tertiary amine or sulfide in the presence of an acid. The acids so used typically have dissociation constants greater than $1 \times 10^{-5}$, and include both organic and inorganic acids.

Harris et al. in U.S. Pat. No. 4,020,030 disclose the preparation of water-soluble or water-dispersible (oil-in-water) sulfonium-modified epoxy resins having superior coating properties and low toxicity by using epoxy resins having an epoxy equivalent weight greater than about 500 and/or by converting greater than about 70 percent of the epoxy groups in the epoxy resins by reaction with a sulfide and an acid. These sulfonium-modified epoxy resins are used as coatings on various substrates and are applied by conventional techniques as opposed to electrodeposition.

In view of the deficiencies of the conventional vinyl ester resins, it is highly desirable to provide a process for preparing sulfonium-stabilized, water-compatible ionizing radiation and light-curable vinyl ester resins in an environment that is essentially free of organic solvent.

SUMMARY OF THE INVENTION

The present invention is such a desirable process. The process is a method for preparing sulfonium-stabilized, water-compatible, radiation-curable vinyl ester compounds wherein epoxy compounds having on the average at least one pendant or terminal 1,2-epoxy group per molecule are reacted with a mercaptan and with an unsaturated monocarboxylic acid to form, on the average, vinyl ester compounds containing sulfide moieties after which said sulfide moieties are reacted with an alkylene oxide and a protonic acid to form sulfonium moieties of said vinyl ester compounds. The process contemplates converting sufficient numbers of said 1,2-epoxy groups to sulfonium groups to render said vinyl ester compounds water compatible, and converting the remainder of the 1,2-epoxy groups to yield a vinyl ester compound which can be cured by actinic light or ionizing radiation.

The compounds prepared by the novel process disclosed herein can be transparent or substantially clear liquids which are water-compatible. The compounds prepared by the novel process disclosed herein can also be water-compatible dispersions having low viscosities. By water-compatible is meant that the compounds prepared herein can be thinned to lower viscosities by dilution with water. They are also compatible with many unmodified vinyl ester compounds. The compounds can then be coated onto substrates and cured by actinic light, electron beam or free-radical initiation.

DETAILED DESCRIPTION OF THE INVENTION

Epoxy compounds constitute a known class of compounds, each member of which, on the average, bears at least one pendant or terminal 1,2-epoxy group (i.e., vicinal epoxy groups). Any member of this known group is suitable for use herein. The most preferred epoxy compounds are the epoxy resins. Epoxy resins useful herein have epoxy equivalent weights sufficiently low enough to render the resulting vinyl ester resins containing sulfonium moieties sufficiently water-compatible. Preferably, the epoxy resins employed in the practice of this invention have epoxy equivalent weights of less than about 5000, more preferably less than about 1000, and most preferably less than about 500. Suitable such epoxy resins are described, for example, in U.S. Pat. Nos. 3,477,990 and 3,793,278; Canadian Patent No. 893,191; German Patent Application No. 2,206,218 and the text *Handbook of Epoxy Resins*, by H. Lee and K. Neville, McGraw Hill, New York (1967). The preferred classes of epoxy compounds for use herein correspond to Formulas I, II and III below.

The first of these includes, for example:

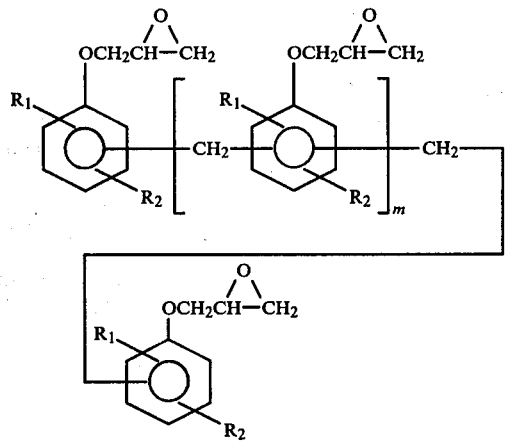

wherein $R_1$ and $R_2$ are hydrogen, lower alkyl of 1 to 6 carbon atoms, chlorine or bromine, and m has an average numerical value of up to about 5, most preferably up to about 3.

The second class includes, for example:

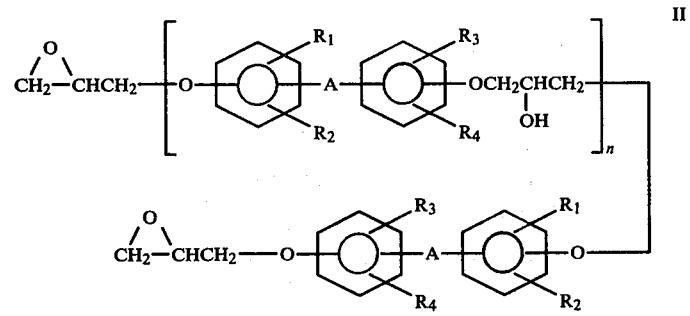

wherein $R_1$, $R_2$, $R_3$ and $R_4$ are each independently hydrogen, lower alkyl of 1 to 6 carbon atoms, chlorine or bromine and —A— is —S—, —O—, —S-S—,

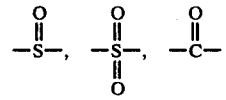

or a divalent saturated hydrocarbon of from 1 to 6 carbon atoms, such as, methylene, ethylene, isopropylidene, cyclohexylidene, and the like, and n has an average numerical value of up to about 12, more preferably up to about 5, most preferably up to about 3. Also useful are the hydrogenated equivalents, such as those from hydrogenated bisphenol-A. An example of an especially preferred resin is a glycidyl ether which is the reaction product of epichlorohydrin with bisphenol-A having an epoxy equivalent weight of about 170 to about 1000, and most preferably about 170 to about 500.

In Formulas I and II, $R_1$–$R_4$ are each preferably hydrogen and A is preferably isopropylidene.

The third class includes, for example:

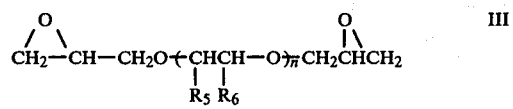

wherein $R_5$ and $R_6$ are each independently hydrogen or lower alkyl. Preferably, $R_5$ is hydrogen and $R_6$ is hydrogen or methyl and n has an average numerical value of up to about 60, most preferably up to about 30. Essentially, n is an integer of value low enough to render the resultant sulfonium-stabilized vinyl ester resin water-campatible. The identity of $R_5$ and $R_6$ and the value of n are related in that when $R_5$ and $R_6$ are larger substituents, n will be a lower value and vice versa. An especially preferred epoxy resin can be a diglycicyl ether of a polypropylene glycol having an epoxy equivalent weight of about 94 to about 500.

Other aliphatic and aromatic epoxy compounds, such as the diglycidyl ether of cyclohexanedimethanol, will be apparent to the skilled worker. Copolymers of glycidyl methacrylate or related glycidyl monomers can also be employed. Other polymers containing pendant 1,2-epoxy groups are also operative.

Other epoxy compounds include the monoepoxide compounds corresponding to Formula IV can also be employed.

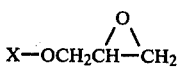

IV in which X is hydrocarbyl or inertly substituted hydrocarbyl of at least about 6 carbon atoms. X is preferably aryl or alkaryl and is more preferably phenyl or ($C_1-C_4$) alkylphenyl. Compounds represented by Formula IV include, for example, butyl glycidyl ether, phenyl glycidyl ether, t-butylphenyl glycidyl ether, tolyl glycidyl ether, chlorophenyl glycidyl ether, cyclohexyl glycidyl ether, benzyl glycidyl ether, n-octyl glycidyl ether, decyl glycidyl ether, dodecyl glycidyl ether, tetradecyl glycidyl ether and the like. Monoepoxide compounds can also include α-olefin epoxides as represented by Formula V:

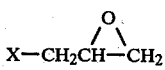

V in which X is hydrocarbyl or inertly substituted hydrocarbyl as previously defined. Mixtures of monoepoxide compounds with compounds containing a plurality of 1,2-epoxy groups are also operative.

The mercaptans are likewise a well-known class of compounds having many members. Any member of this group can be used which reacts with epoxy groups. Preferred mercaptans are those corresponding to the formula R-S-H wherein R is hydrocarbyl or inertly substituted hydrocarbyl groups of from 1 to about 24 carbon atoms, more preferably, R is alkyl or hydroxyalkyl of from 1 to about 20 (most preferably, 1 to 4) carbon atoms. Examples of suitable such mercaptans include methyl mercaptan, ethyl mercaptan, butyl mercaptan, octyl mercaptan, dodecyl mercaptan, octadecyl mercaptan, phenyl mercaptan, tolyl mercaptan, allyl mercaptan, cyclohexyl mercaptan, hydroxyethyl mercaptan, and the like. Although much less preferred, hydrogen sulfide can also be employed. The β-hydroxy mercaptans are preferred due to odor considerations. A highly preferred mercaptan is 2-mercaptoethanol.

The unsaturated acids employed herein in forming the ester moiety are protonic acids preferably having a dissociation constant of at least about $1 \times 10^{-7}$ most preferably at least $1 \times 10^{-5}$. Such acids are normally organic carboxylic acids and are more preferably monocarboxylic acids. Suitable acids include, for example, acrylic acid, methacrylic acid, maleic acid, itaconic acid, longer chain acids such as oleic acid, linoleic acid, tall oil acid and dimer acids, and the half esters of hydroxy alkyl acrylates and methacrylates formed, for example, by reacting 2-hydroxyethyl acrylate with phthalic anhydride, maleic anhydride, succinic anhydride and the like. Acrylic acid and methacrylic acid are the most preferred monocarboxylic acids. Mixtures of saturated acids and the acids bearing polymerizable vinyl groups can also be used, for example, as a means of limiting the vinyl functionality of the product.

The alkylene oxides employed herein are preferably small in size. Representative reactants are ethylene oxide, propylene oxide, butylene oxide, or glycidol, with ethylene oxide being most preferred. Glycidyl ethers such as allylglycidyl ether can also be employed. The size of the alkylene oxide used is dependent upon the resin. That is, if the composition becomes too hydrophobic, then it will be less water-compatible. Therefore, if the resin used is larger in size, the lower molecular weight alkylene oxides are preferred.

The acid employed in sulfonium formation step can vary. Specifically, the anion of the sulfonium molecule may be composed of unsaturated, saturated or a mixture of saturated and unsaturated protonic acids. Preferred acids used in the sulfonium formulation step are carboxylic acids, such as acetic acid, and most preferably the unsaturated monocarboxylic acids, such as acrylic acid, methacrylic acid and the other previously mentioned unsaturated acids. However, the longer chain acids are much less preferred. It is even possible to use inorganic mineral acids such as hydrochloric acid.

In the process of this invention, resins containing sulfide moieties are first produced by partial reaction of the epoxy reactant with the mercaptan. The epoxy resin is combined with the mercaptan and reacted, preferably in the presence of a suitable catalyst, such as onium salts, which include, for example, benzyl trimethyl ammonium chloride, to produce a resin containing sulfide moieties which also contains residual epoxy groups. Sulfides are believed to catalyze the esterification reaction between epoxy groups and unsaturated carboxylic acids (or more properly perhaps the sulfonium groups generated in situ in such an instance are believed to catalyze the esterification reaction). The reaction product is then reacted with an unsaturated carboxylic acid to produce a sulfide-modified vinyl ester resin. With the appropriate catalysts, these two reactions can be run in either order. In the final step, sulfonium moieties are formed by reaction of the partially esterified resin containing sulfide moieties with the protonic acid and the alkylene oxide reactant. In the process, therefore, the resin containing sulfide moieties is utilized to present enough sulfonium groups in the final product to render the reaction product water-compatible. Normally, satisfactory results are achieved using from about 0.1 to about 0.8 equivalent of mercaptan, preferably having from 1 to about 12 carbon atoms per epoxy equivalent weight of the epoxy compound. The acid used in forming the ester moiety is normally employed in essentially stoichiometric amounts (i.e., one equivalent acid per epoxy equivalent weight of the epoxy resin) or in a slight deficiency. The alkylene oxide is then added to convert the sulfide moieties of the resin to sulfonium moieties by employing an amount of the alkylene oxide preferably from about 0.1 to about 0.8 equivalent based on starting epoxy resin. The amount of the alkylene oxide so employed is preferably an amount sufficient to convert the sulfide moieties to sulfonium moieties. The final products contain very few, if any, residual epoxy groups.

Water is preferably included in the process or the step of the process during which the sulfonium moiety is generated because it is believed to increase the stability of the sulfonium moieties. The compounds prepared by the process of this invention can be transparent or substantially clear liquids which are water-compatible. The amount of water in the compositions can be any amount up to that where phase separation occurs. The amount will vary depending to a large extent on the amount of sulfonium moiety present; the greater the concentration of sulfonium moiety, the more water that can be included before phase separation. For example, a resinous composition prepared using the process of this invention can contain as little as about 20 equivalent percent sulfonium ion and as high as about 80 equivalent percent ester and not undergo phase separation until a water content of greater than about 30 weight percent is incorporated into said resinous composition. Alternatively, a resinous composition prepared using the process of this invention can contain as little as about 20 equivalent percent ester and as high as about 80 equivalent percent sulfonium ion, and not undergo phase separation until a water content of greater than about 85 percent is incorporated into said resinous composition. Alternatively, the compounds can be water-compatible dispersions. The sulfonium-modified compositions have greatly enhanced compatibilities and greatly reduced viscosities, well within the range of useful coating application viscosities.

It is also understood that blends of vinyl ester resins and vinyl ester resins containing sulfonium moieties can be employed herein. Such blends can be prepared without macrophase separation. For example, the reaction product prepared by the novel process disclosed herein can be combined with a diester of a diglycidyl ether and an unsaturated monocarboxylic acid.

The sulfonium-stabilized, water-compatible, radiation-curable vinyl ester resins prepared by the process of the present invention are most preferably resinous compositions comprising molecules containing ester moieties resulting from the esterification of an epoxy resin and an unsaturated monocarboxylic acid. Said preferred molecules also contain sufficient sulfonium moieties to make said resinous composition water-compatible, and are the reaction product of glycidyl ether and an unsaturated acid reacted in the presence of a mercaptan, wherein said sulfonium moieties have the structure:

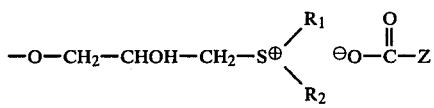

wherein $R_1$ and $R_2$ are hydrocarbyl or inertly substituted hydrocarbyl groups of from 1 to about 24 carbon atoms. Z is the noncarboxylic portion of said unsaturated monocarboxylic acid when said ester is the monoester of a monoglycidyl ether. Alternatively, Z is the noncarboxylic portion of a saturated or unsaturated monocarboxylic acid when said ester is a polyester of a polyglycidyl glycidyl ether.

Inhibitors, such as hydroquinone, p-methoxyphenol, phenothiazine and the like are normally added to the reaction mixture to prevent premature gelation of the product during processing by radical polymerization of vinyl double bonds. It is also useful in some instances to post-add such polymerization inhibitors to increase the shelf stability of the final product.

Optionally, cosolvents can be used to increase processability. Examples include lower alcohols, such as methanol, ethanol, and the like; ketones, such as acetone, methyl ethyl ketone, and the like; and reactive diluents, such as 2-hydroxyethyl acrylate, 2-hydroxypropyl acrylate, and the like.

The compositions are useful coating materials which can be cured (i.e., cross-linked) by actinic light or ionizing radiation. The compositions are water-compatible and are applied to substrates, such as wood, glass, metal, plastics, paper, fabric, leather, etc. by conventional techniques. The coating is subsequently cured by passing the coated article under a source of actinic or ionizing radiation. Normally, this involves passing the coated article under a bank of ultraviolet lights or an electron beam. However, other methods may be used which generate a source of free radicals (e.g., heat, conventional free-radical initiators, such as peroxides, azobisisobutyronitrile, and the like).

The compositions can also be blended with conventional additives for use in coatings. Typical of such additives would include leveling agents, pigments, fillers, initiators, stabilizers, other vinyl materials, and ultra-violet cure agents such as benzoin ethers, and benzophenone/tertiary amine combinations. Potential uses include preparation of inks, binders, adhesives, mortars, sizing agents and glass reinforced components.

The following examples are given to illustrate the invention but should not be construed as limiting the scope thereof.

EXAMPLE 1

(A) Preparation of Partially Capped D.E.R. ® 331 Liquid Epoxy Resin with 2-Mercaptoethanol The diglycidyl ether of bisphenol-A (a liquid epoxy resin sold commercially by The Dow Chemical Company as D.E.R. ® 331 epoxy resin, having an epoxy equivalent weight of about 190) (190 g; 1.0 equivalent) and catalyst (0.1 g, ethyltriphenylphosphonium acetate acetic acid complex) are combined in a 400 ml, three-necked, round-bottomed flask equipped with an addition funnel, stirrer, condenser and thermocouple. The resin is heated to 110° C. and 2-mercaptoethanol (46.8 g, 0.6 eq.) is added from the addition funnel over a 10-minute period. The reaction initially exotherms to 144° C., and once the temperature is reequilibrated at 110° C., it is maintained there for an additional 30 minutes. The final product is a resin containing sulfide moieties which contains residual epoxy groups which can be esterified with organic acids.

(B) Esterification of the Sulfide-Modified Epoxy Resin

The reaction product in Example 1(A) (152 g, 0.5 eq. epoxide), hydroquinone (0.05 g), and p-methoxyphenol (0.05 g) are charged into a 500 ml flask which is equipped in the same manner as described in Example 1. The resin is heated to 90° C., and acrylic acid (36.0 g, 0.5 eq.) is added over a 25-minute period. The reaction temperature is maintained between 90° and 95° C. for an additional hour. Then the sulfide-modified vinyl ester resin is cooled to 70° C. The product is then further reacted to form the sulfonium derivative.

(C) Conversion of the Sulfide-Modified Vinyl Ester Resin into a Water-Thinnable Resin The water-cooled condenser used in Examples 1(A) and 1(B) is replaced with a dry ice-cooled condenser. Additional hydroquinone (0.05 g), p-methoxyphenol (0.05 g), acrylic acid (21.6 g, 0.3 eq.) and water (19.3 g) are added. The mixture is heated to 70° C. and ethylene oxide (14.1 g, 0.32 eq.) is added over a 10-minute period. The reaction is monitored by titrating the residual acid. After an additional 140 minutes, water (36.8 g) is added to give a final product with 80 percent solids. The final product contains 0.435 meq/g of acid (85 percent conversion of the total acrylic acid added) and 0.3735 meq/g of sulfonium (49 percent conversion of the total sulfide to sulfonium).

EXAMPLE 2

Utility as Coating Compositions

A Coating from the Reaction Product of Example 1(C)

D.E.R. ® 331 sulfonium acrylate resin (15.93 g of product as described in Example 1(C) is blended with benzophenone and dimethylaminoethanol (0.64 g of a 50/50 weight mixture) and water (3.00 g). A film is cast on a Bonderite ® 37 panel using a wire-wound coating rod. This is cured to a tack-free, solvent resistant (750 MEK double rubs) film with 2 passes at 100 ft/minute under a 1×200 watt/linear inch high intensity Mercury arc lamp.

What is claimed is:

1. A process for preparing sulfonium-stabilized, water-compatible, radiation-curable vinyl ester compounds wherein epoxy compounds having on the average at least one pendant or terminal 1,2-epoxy group per molecule are reacted with a mercaptan and with an unsaturated monocarboxylic acid to form, on the average, vinyl ester compounds containing sulfide moieties after which said sulfide moieties are reacted with an alkylene oxide and a protonic acid to form sulfonium moieties of said vinyl ester compounds.

2. A process for preparing sulfonium-stabilized, water-compatible, radiation-curable vinyl ester resins wherein epoxy resins having on the average at least one pendant or terminal 1,2-epoxy group per molecule are reacted with a mercaptan and with an unsaturated monocarboxylic acid to form, on the average, vinyl ester resins containing sulfide moieties after which said sulfide moieties are reacted with an alkylene oxide and a protonic acid to form sulfonium moieties of said vinyl ester resins.

3. A process for preparing a sulfonium-stabilized, water-compatible, radiation-curable vinyl ester resins whereby molecules containing ester groups resulting from the esterification of an epoxy resin and an unsaturated monocarboxylic acid and molecules containing sulfonium groups and having the structure:

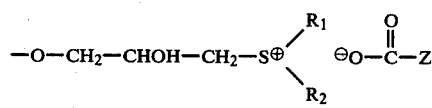

wherein $R_1$ and $R_2$ are hydrocarbyl or inertly substituted hydrocarbyl groups of from 1 to 24 carbon atoms, and Z is the noncarboxylic portion of said unsaturated monocarboxylic acid when said ester is the monoester of a monoglycidyl ether, and Z is the noncarboxylic portion of a saturated or unsaturated monocarboxylic acid when said ester is a polyester of a polyglycidyl ether whereby said resins are made by the process claimed in claim 2.

4. A process for preparing the sulfonium-stabilized vinyl ester resin as claimed in claim 2 wherein said unsaturated monocarboxylic acid is acrylic or methacrylic acid.

5. A process as claimed in claim 2 wherein said sulfonium moiety is a sulfonium acrylate or methacrylate.

6. A process as claimed in claim 2 wherein said vinyl ester resin is derived from an epoxy resin bearing, on the average, at least two vicinal epoxy groups per resin molecule.

7. A process as claimed in claim 2 wherein said epoxy resin bears, on the average, at least one glycidyl group per resin molecule.

8. A process for preparing the composition claimed in claim 2 wherein said epoxy resin corresponds to the formula:

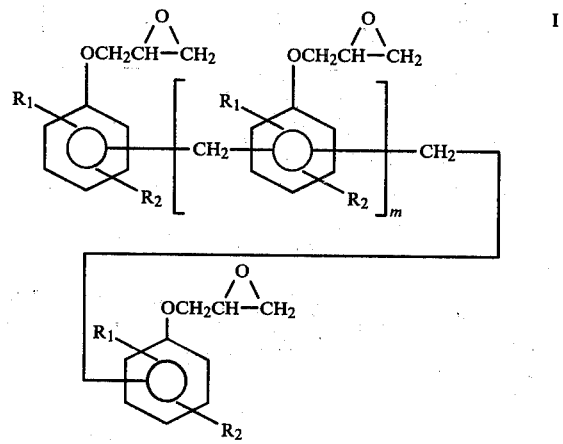

wherein $R_1$ and $R_2$ are hydrogen, lower alkyl of 1 to 6 carbon atoms, chlorine or bromine and m has an average numerical value of up to about 5; or

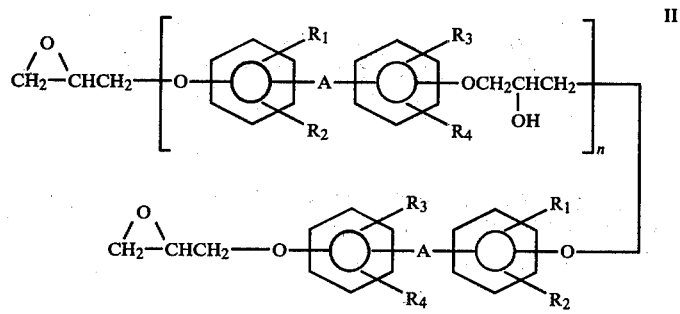

wherein $R_1$, $R_2$, $R_3$ and $R_4$ are each independently hydrogen, lower alkyl of 1 to 6 carbon atoms, chlorine or bromine and —A— is —S—, —O—, —S—S,

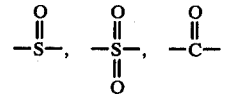

or a divalent saturated hydrocarbon of from 1 to 6 carbon atoms and n has an average numerical value of up to about 12; or

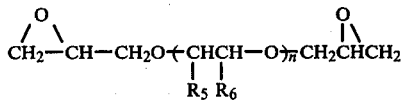

wherein $R_5$ and $R_6$ are each independently hydrogen or lower alkyl and n has a numerical value of up to 60.

9. A process for preparing the composition claimed in claim 2 wherein said epoxy resin corresponds to the formula:

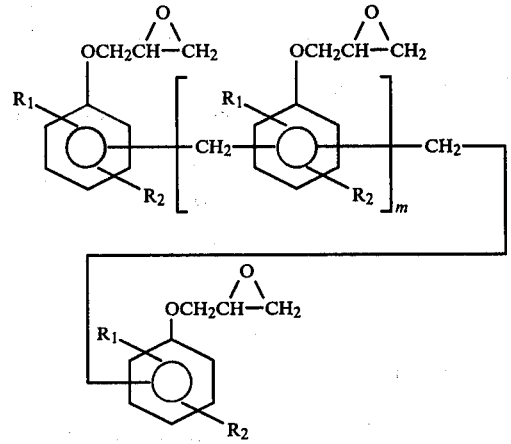

wherein $R_1$ and $R_2$ are hydrogen, lower alkyl of 1 to 6 carbon atoms, chlorine or bromine and m has an average numerical value of up to about 3; or

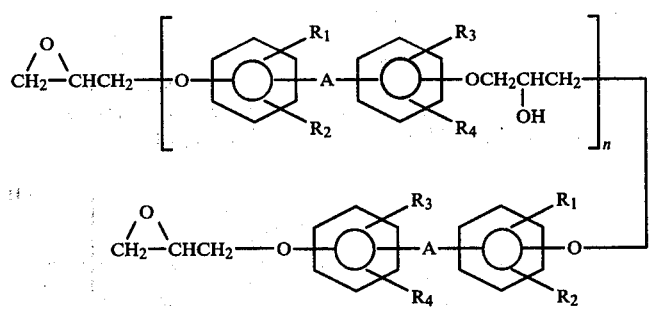

wherein $R_1$, $R_2$, $R_3$ and $R_4$ are each independently hydrogen, lower alkyl of 1 to 6 carbon atoms, chlorine or bromine and —A— is —S—, —O—, —S—S,

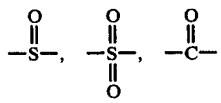

or a divalent saturated hydrocarbon of from 1 to 6 carbon atoms and n has an average numerical value of up to about 3; or

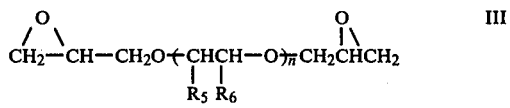

wherein $R_5$ and $R_6$ are each independently hydrogen or lower alkyl and n has a numerical value of up to 30.

10. A process as claimed in claim 8 wherein said vinyl ester bears acrylate or methacrylate moieties and wherein said sulfonium moiety is a sulfonium acrylate or methacrylate.

11. A process as claimed in claim 9 wherein said vinyl ester resin bears acrylate or methacrylate moieties and wherein said sulfonium moiety is a sulfonium acrylate or methacrylate.

12. A process as claimed in claim 2 wherein said preparation involves the reaction product of (1) a glycidyl ether with (2) about one equivalent of acrylic or methacrylic acid (3) from about 0.1 to about 0.8 equivalent or a mercaptan having a total carbon content of from 1 to about 12 carbon atoms and (4) from about 0.1 to about 0.8 equivalent of ethylene oxide.

13. A process as claimed in claim 12 wherein said glycidyl ether is (a) the diglycidyl ether of a polypropylene glycol having an epoxy equivalent weight of from about 94 to about 500 or (b) is the reaction product of epichlorohydrin with bisphenol-A having an epoxy equivalent weight of from about 170 to about 500 and wherein said mercaptan is 2-mercaptoethanol.

14. A process as claimed in claim 12 wherein said reaction product is combined with a diester of a diglycidyl ether and an unsaturated monocarboxylic acid.

15. A process as claimed in claim 2 wherein said unsaturated monocarboxylic acid has an acid dissociation constant of at least about $1 \times 10^{-7}$.

16. A process as claimed in claim 2 wherein said unsaturated monocarboxylic acid has an acid dissociation constant of at least about $1 \times 10^{-5}$.

* * * * *